US005788902A

United States Patent [19]
Planeta

[11] Patent Number: 5,788,902
[45] Date of Patent: Aug. 4, 1998

[54] EXTRUSION OF DEGRADABLE PLASTIC MATERIAL IN TUBULAR FORM

[76] Inventor: Mirek Planeta, 199 Traders Blvd. East, Mississauga, Ontario, Canada, L4Z 2E5

[21] Appl. No.: 822,628

[22] Filed: Mar. 21, 1997

[51] Int. Cl.$^6$ .......................... B29C 47/06; B29C 47/20
[52] U.S. Cl. .................. 264/171.27; 264/171.29; 264/173.13; 264/209.8; 425/133.1; 425/462
[58] Field of Search ................ 264/171.27, 171.29, 264/173.13, 209.8; 425/133.1, 462

[56] References Cited

U.S. PATENT DOCUMENTS

| | | | |
|---|---|---|---|
| 5,143,677 | 9/1992 | Blemberg et al. | 264/171.27 |
| 5,262,109 | 11/1993 | Cook | 264/171.29 |

Primary Examiner—Leo B. Tentoni
Attorney, Agent, or Firm—Rogers & Scott

[57] ABSTRACT

A method of extruding degradable plastic material in tubular form includes providing an annular extrusion die having an annular extrusion orifice and a longitudinal extending annular passage for conveying plastic material to the extrusion orifice. The die also has at least one arcuate passage extending at least partly around the annular passage such that the annular passage completely surrounds, or where there is more than one arcuate passage in combination completely surround, the annular passage inwardly or outwardly thereof and are in communication therewith. A separate melt stream of degradable plastic material is provided for each arcuate passage and each separate melt stream of degradable plastic material is incorporated with non-degradable plastic material in a circumferentially continuous manner to produce separate encapsulated melt streams. Each encapsulated melt stream is fed to a respective arcuate passage to cause encapsulated plastic material to pass into the annular passage with subsequent extrusion in tubular form from the annular die orifice.

13 Claims, 1 Drawing Sheet

EXTRUSION OF DEGRADABLE PLASTIC MATERIAL IN TUBULAR FORM

FIELD OF THE INVENTION

This invention relates to the extrusion in tubular form of degradable plastic material.

BACKGROUND OF THE INVENTION

It is well known that it is difficult to extrude some plastic materials, such as PVDC, because of their susceptibility to degradation during extrusion as a result of contact with the walls of the extrusion die. Attempts have been made to overcome this problem by encapsulating the degradable plastic material with non-degradable plastic material prior to extrusion. Such encapsulation was originally carried out when extruding plastic material in sheet form, but subsequent attempts have also been made to encapsulate plastic material during extrusion in tubular form from annular extrusion dies.

Initial attempts to carry out encapsulation with annular extrusion dies have utilized the same general principle which was used with extrusion dies for sheet material, namely in which a melt stream of degradable plastic material encapsulated with non-degradable plastic material was divided into two streams and fed around the annular extrusion die in opposite directions and then re-joined on an opposite side of the die. Annular extrusion dies of these kind have been known as crosshead or side feed dies, a typical example being shown in U.S. Pat. No. 5,143,677 (Blemberg et al). However, problems arise where the divided melt streams are rejoined. Attempts have been made to overcome this problem but have not been particularly successful because this method always produces problems in the area where the divided melt streams have been rejoined.

It is therefore an object of the present invention to provide a method of extruding degradable plastic material in tubular form which substantially overcomes the problem mentioned above.

SUMMARY OF INVENTION

According to the present invention, a method of extruding degradable plastic material in tubular form includes providing an annular extrusion die having an annular extrusion orifice and a longitudinally extending annular passage for conveying plastic material to the extrusion orifice, the die also having at least one arcuate passage extending at least partly around the annular passage such that the arcuate passage completely surrounds, or where there is more than one arcuate passage in combination completely surround, the annular passage inwardly or outwardly thereof and in communication therewith. A separate melt stream of degradable plastic material is provided for each arcuate passage, and each separate melt stream of degradable plastic material is encapsulated with non-degradable plastic material in a circumferentially continuous manner to produce separate encapsulated metal streams. Each encapsulated metal stream is fed to a respective arcuate passage to cause encapsulated plastic material to pass into the annular passage with subsequent extrusion in tubular form from the annular die orifice. Thus, after encapsulation, none of the degradable plastic material contacts a die surface.

The annular extrusion die may have an inner body member surrounded by an annular outer body member forming the longitudinally extending annular passage therebetween, with the inner body member having two arcuate passages formed by two helical grooves in the inner body member. The two helical grooves may commence at diametrically opposite positions in the inner body member and extend around the inner body member in the same direction.

Each helical groove may extend around the inner body member for just over 180° so as to form a three layer tubular film. Alternatively, each helical groove may extend around the inner body member for just over 360° so as to form a five layer tubular film, and the longitudinally extending annular passage may be wider beyond the 180° position of the helical grooves than before the 180° position. In another alternative, each helical groove may extend around the inner body member for just over 540° so as to form a seven layer tubular film.

The degradable plastic material may be a vapour barrier material. The vapour barrier material may be relatively rigid and the non-degradable plastic material may be relatively elastic.

DESCRIPTION OF THE DRAWING

One embodiment of the invention will now be described, by way of example, with reference to the accompanying drawing which shows a cross-sectional view of an annular extrusion die in accordance with the invention.

DESCRIPTION OF THE PREFERRED EMBODIMENT

Figure 1:
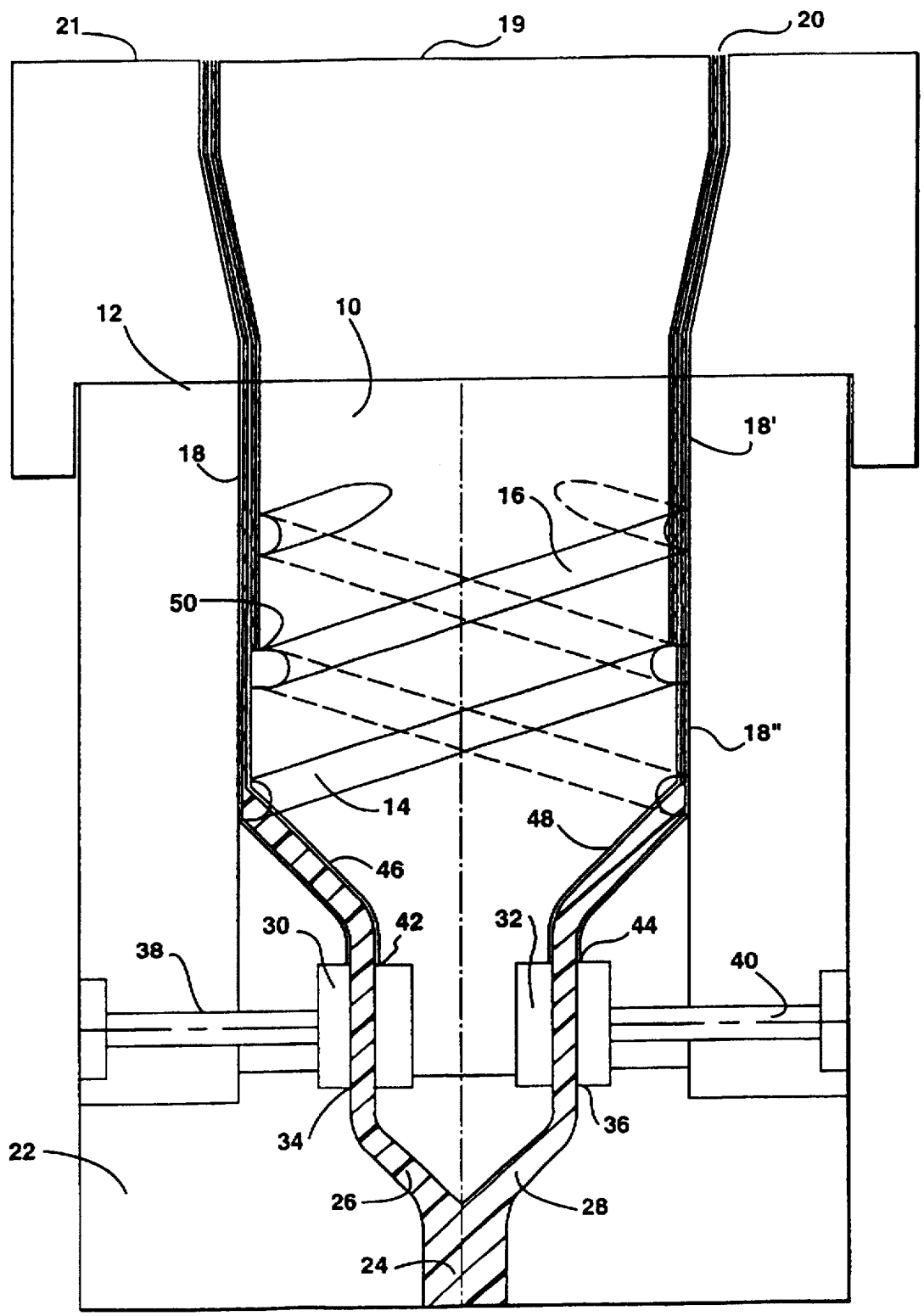

Referring to the drawing, an annular extrusion die has an inner die body member 10 and an outer annular die body member 12 surrounding the inner die body member 10. The outer surface of the inner body member 10 has two helical grooves 14, 16 which commence at diametrically opposite positions in a lower portion of the inner body member 10 and extend upwardly in a helical manner in the same direction around the inner die body member 10 for just over 360°. The inner and outer die body members 10, 12 form a longitudinally extending annular passage 18 with which the grooves 12, 14 are in communication and which leads to an annular extrusion orifice 20. The extrusion orifice 20 is actually formed by inner and outer lip members 19, 21 mounted on top of the inner and outer die body members 10, 12 in known manner.

The inner and outer body members 10, 12 are mounted on a base member 22 which has a main feed passage 24 for degradable plastic material extending upwardly from the bottom thereof. Within the body member 22, the main passage 24 divides into two feed passages 26, 28. Two encapsulating units 30, 32 are located between the inner body member 10 and the base member 22 and have inlets 34, 36 communicating with the feed passages 26, 28 respectively. Each encapsulating unit 30, 32 encapsulates degradable plastic material passing therethrough from the feed passages 26, 28 respectively in a circumferentially continuous manner with non-degradable plastic material supplied to the encapsulating units 30, 32 through passages 38, 40 respectively, the passages 38, 40 each being partly in the outer body member 12 and partly in the inner body member 10.

Each encapsulating unit 30, 32 has an outlet 42, 44 respectively which feed an encapsulated stream of plastic material, i.e. a stream of degradable plastic material encapsulated in a circumferentially continuous manner with a non-degradable plastic material, to the lower end of the helical grooves 14, 16 respectively through feed passages 46, 48 respectively in the inner body member 10.

It will be noted that, at the position 50 where each helical groove 14, 16 has traversed 180° from its lower starting position, the diameter of the inner body portion 10 is reduced so that the width of the annular passage 18' above the position 50 is somewhat greater than the width of the annular passage 18" below the position 50.

In use, a melt stream of degradable plastic material, which may be vapour barrier material, such as PVDC or EVOH, is passed into the main feed passage 24 and then divided into two streams which pass through passages 26, 28 to the encapsulating units 30, 32 where the divided streams are completely encapsulated around their circumferences with non-degradable plastic material, such as EVA. The encapsulated streams then pass through passages 46, 48 into the helical grooves 14, 16. Until the 180° position of the helical grooves 14, 16, the encapsulated material passes into the lower narrower portion 18" of the annular passage 18 to form a three layer tubular film of plastic material, i.e. a tubular film with an inner layer of degradable plastic material and inner and outer layers of non-degradable plastic material. Beyond the 180° position 50, encapsulated plastic material passes from the helical grooves 14, 16 into the wider portion 18' of the annular passage 18 to form further layers on the inside of the previously formed tubular film. The resultant five layer tubular film is then extruded from the annular die orifice 20.

As shown in the drawing, the helical grooves 14, 16 extend around the inner die body member 10 in the same direction for slightly more than 360°. The resultant tubular film has a central relatively thick layer of non-degradable plastic material, a layer of degradable plastic material on the inner and outer sides thereof, and innermost and outermost layers of non-degradable plastic material. Thus, when the degradable plastic material is vapour barrier material, the tubular film is provided with two vapour barrier layers. The presence of two vapour barrier layers minimizes the possibility of irregularities or pinholes in the barrier layers causing a problem, because irregularities or pinholes in one barrier layer are unlikely to be radially aligned with irregularities or pinholes in the other barrier layer. Further, in this case, each vapour barrier layer can be relatively thin, for example below 10 microns, to reduce the possibility of the barrier layer cracking, as happens with some plastic materials (for example highly crystalline plastic material) when the barrier layer is thicker. Also, when the degradable plastic material is relatively rigid and the non-degradable plastic material is relatively elastic, the alternating layers of rigid and elastic plastic material provide a tubular film of high impact strength.

It will be understood that the helical grooves 14, 16 may extend around the inner die body member 10 in the same direction for just over 180° so as to form a three layer tubular film. Alternatively, the helical grooves 14, 16 may extend around the inner die body member 10 for just over 540° to produce a seven layer tubular film. Also, the degradable plastic material entering the passage 24 may be circumferentially encapsulated with non-degradable plastic material as primary encapsulation, with the encapsulating units 30, 32 thus providing secondary encapsulation.

Other embodiments of the invention will now be readily apparent to a person skilled in the art from the foregoing description of a preferred embodiment. For example, there may be only one helical groove which extends at least 360° around the inner body member. Also, the arcuate passage or passages may be provided in the surface of a body member which extends perpendicularly to the longitudinally extending annular passage, with the encapsulated plastic material passing from the arcuate passage or passages into an initial portion of the longitudinally extending annular passage.

The scope of the invention is defined by the appended claims.

I claim:

1. A method of extruding degradable plastic material in tubular form including:

providing an annular extrusion die having an annular extrusion orifice and a longitudinal extending annular passage for conveying plastic material to the extrusion orifice, the die also having at least one arcuate passage extending at least partly around the annular passage such that the arcuate passage completely surrounds, or where there is more than one arcuate passage in combination completely surround, the annular passage inwardly or outwardly thereof and are in communication therewith, providing a separate melt stream of degradable plastic material for each arcuate passage, encapsulating each separate melt stream of degradable plastic material with non-degradable plastic material in a circumferentially continuous manner to produce separate encapsulated melt streams, and feeding each encapsulated melt stream to a respective arcuate passage to cause encapsulated plastic material to pass into the annular passage with subsequent extrusion in tubular form from the annular die orifice.

2. A method according to claim 1 wherein the annular extrusion die has an inner body member surrounded by an annular outer body member forming the longitudinal extending annular passage therebetween, and the inner body member has two arcuate passages formed by two helical grooves in the inner body member.

3. A method according to claim 2 wherein the two helical grooves commence at diametrically opposite positions in the inner body member and extend around the inner body member in the same direction.

4. A method according to claim 3 wherein each helical groove extends around the inner body member for just over 180° so as to form a three layer tubular film.

5. A method according to claim 3 wherein each helical groove extends around the inner body member for just over 360° so as to form a five layer tubular film.

6. A method according to claim 5 wherein the longitudinally extending annular passage is wider beyond the 180° position of the helical grooves than before said 180° position.

7. A method according to claim 3 wherein each helical groove extends around the inner body member for just over 540° so as to form a seven layer tubular film.

8. A method according to claim 1 wherein the degradable plastic material is vapour barrier material.

9. A method according to claim 8 wherein the vapour barrier material is relatively rigid and the non-degradable material is relatively elastic.

10. An annular extrusion die for extruding degradable plastic material in tubular form, said extrusion die having an inner body member and an outer body member surrounding the inner body member and forming a longitudinally extending annular passage therebetween which communicates with an annular extrusion orifice, the inner body member having at least one helical groove for passing plastic material into the longitudinally for subsequent extrusion in tubular form from the annular extrusion orifice, the die also having a supply passage for supplying degradable plastic material to the helical groove or grooves, and an encapsulating unit for encapsulating the degradable plastic material with a non-degradable plastic material in a circumferentially continuous manner before the degradable plastic material enters the helical groove or grooves.

11. An extrusion die according to claim 10 wherein the inner body member has two helical grooves extending around the inner body member in the same direction, and the die also has two encapsulating units, one of the encapsulating units operating to encapsulate a stream of degradable plastic material with non-degradable plastic material before it enters one of the helical grooves, and the other encapsulating unit operating to encapsulate a further stream of degradable plastic material with non-degradable plastic material before it enters the other helical groove.

12. An extrusion die according to claim 11 wherein the two helical grooves commence at diametrically opposite positions and extend around the inner body member for just over 360° so as to form a five layer tubular film.

13. An extrusion die according to claim 12 wherein the longitudinally extending passage is wider beyond the 180° position of the helical grooves than prior to the 180° position.

* * * * *